March 20, 1928.
A. S. HUBBARD
ELECTRIC CONVERTER
Filed Dec. 6. 1922
1,662,889
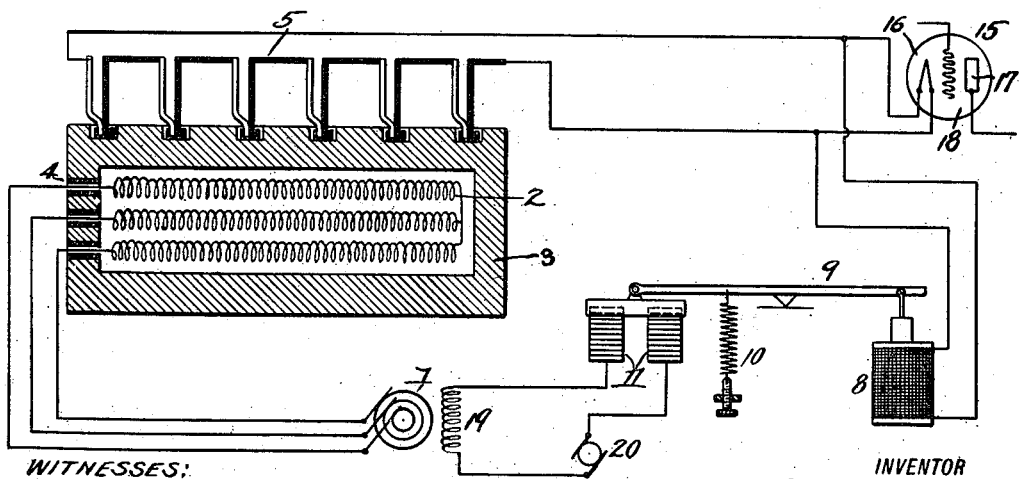

Patented Mar. 20, 1928.

1,662,889

UNITED STATES PATENT OFFICE.

ALBERT S. HUBBARD, OF NEW YORK, N. Y.

ELECTRIC CONVERTER.

Application filed December 6, 1922. Serial No. 605,250.

This invention relates to improvements in systems of electrical conversion where an electric current of one description is, by suitable apparatus, changed into an electric current of another description, such, for instance, as the conversion of an alternating current to a direct current of either, the same or different voltage or of a fluctuating current to a steady current which may at the same time involve an accompanying change of voltage.

The invention also relates to means for preserving practically constant value of the secondary current or voltage, irrespective of commercial variations in the primary source.

In the attempt to make use of the ordinary electric lighting current as supplied commercially in such a convenient and economical manner, there often occurs cases where the slight pulsations or variations, as for instance, those caused by the reversals of an alternating current or the commutation of a direct current, may be inimical to the more perfect operation of the particular device to which the electric current is to be applied.

As an instance of where pulsations or variations act in a way to impair the operation of the translating device, may be cited radio telephone circuits involving vacuum tubes where any pulsation in the electric source, may cause undesired noises to occur in the receiver. In such cases as the power involved is slight the question of economy must yield to the more important ones of efficiency and convenience; which has been partly met in certain instances heretofore by the use of storage batteries; but these have not been entirely satisfactory on account of their inconvenience, their constantly diminishing power, their liability to become exhausted and the injurious nature of the fumes which they produce. Such batteries, besides being inefficient are also uneconomical for such uses as mentioned for the reason that their use is sometimes discontinued for long periods or in the hands of inexpert persons are allowed to become dry or too much discharged so that the net result is an economy only a very small fraction of what their proper use should give.

The object of the present invention is to supply an electric converter that while drawing its energy from the usual commercial circuits will give out a steady and constant current free from alternations or pulsations and also free from any requirement in the way of attention or renewal. To this end the invention consists of apparatus for electric conversion in which an electric heater first transforms the electric energy into heat and a thermopile then converts the heat into electricity. As a means of eliminating the effect of the fluctuations of the primary current the heater element or the thermopile or both, or still better a mass of metal with which the heater element and the thermopile are both in thermal contact is made of such size that heat, although coming in waves, will be stored to a sufficient degree as to cause only a constant flow of current in the secondary or thermopile circuit.

In order to take care of more gradual changes in the primary current I provide an electric translating device in the secondary circuit that acts upon variations occurring in the value of current or electromotive force in the secondary circuit, to bring about a proper correction of the strength of the primary current so as to counteract such tendency to variation.

The accompanying drawings illustrate diagrammatically my invention.

In the drawings, 1 represents a source of electric power in circuit with which is a heater element 2. Surrounding or otherwise closely associated with the heater element is a mass 3 which may, for example, be copper or other metal and which should be insulated as at 4 from electric contact with the heater circuit. At 5 I have shown a thermopile consisting of a suitable number of thermocouples, one member of which may, for example be of antimony and the other of bismuth, and I arrange the thermopile so that one series of junctions thereof are brought into close juxtaposition to the heater. This may be accomplished in various ways as, for example, as shown in the drawings where the series of junctions that are to be heated are shown embedded in recesses in the heater mass, each junction being insulated electrically, but not thermally from the heater by being surrounded with an insulating cup 6 which may, for example, be made of mica or other suitable insulating material. To insure better contact I may also introduce into such insulating cups mercury or other heat equalizing and storage means.

Variations in the primary circuit of either E. M. F. or current will be absorbed in the heater and by the time the heat has engendered a current in the secondary or thermopile circuit, such variations will have become practically eliminated, the degree of this smoothing out of the variations depending upon the mass of material which is heated. It is evident that this mass may consist principally of the electric heater element itself or of the insulation surrounding the same or of the thermopile elements themselves or any combination of these, but I prefer to cause the chief storage of heat to occur in the body 3 which, made of copper, will form a very satisfactory heat storage means. It will be apparent to those skilled in the art that the member C will also act as a shield, preventing electromagnetic pulsations from reaching the secondary circuit.

The heater element in such alternating circuit is preferably made of a non-inductive form.

In the drawing is shown at 15 a radio vacuum tube, 16 being the filament, 17 the plate and 18 the grid, and I have here shown the thermo electric secondary circuit as supplying current to the filament; the electromotive force being held constant over broad variations by a solenoid 8 and rheostat 11.

A similar use may also be made of a thermo electric secondary circuit for providing current for the plate circuit as will be readily understood by those skilled in the art. I have shown here that the regulation may be effected, for example, by having the field circuit 19 of the generator arranged so that the exciting current for same generated by exciting machine 20 is made to pass through the regulating rheostat 11 to the end that any fluctuations occurring in the voltage of the secondary circuit will, by causing a corresponding variation in the strength of the solenoid 8, bring about a strengthening or weakening of the exciting current to cause the proper change in the primary circuit and the electric heater to readjust the current in the thermopile circuit to its proper value.

I claim:—

As a source of direct current, a thermoelectric generator, with a heater energized by electric current, and a metallic body between the heater and the generator adapted to absorb the pulsating energy from the heater and pass it on to the generator without pulsations.

ALBERT S. HUBBARD.